(12) United States Patent
Barnes et al.

(10) Patent No.: US 9,501,927 B2
(45) Date of Patent: Nov. 22, 2016

(54) METHOD AND SYSTEM FOR QUEUE-BASED PROCESSING OF RFID LOCATING AND SEQUENCING EVENTS

(71) Applicant: Trapeze Software ULC, Mississauga (CA)

(72) Inventors: Sharon Ann Irma Barnes, Kelowna (CA); Marty Charles Brooks, Kelowna (CA); Paul Anthony Ernsdorff, Spokane, WA (US); Dylan Gray, Spokane, WA (US); Warren Malcolm Pennington Scott, Kelowna (CA)

(73) Assignee: Trapeze Software ULC, Mississauga (CA)

(*) Notice: Subject to any disclaimer, the term of this patent is extended or adjusted under 35 U.S.C. 154(b) by 0 days.

(21) Appl. No.: 14/546,231

(22) Filed: Nov. 18, 2014

(65) Prior Publication Data

US 2016/0140841 A1    May 19, 2016

Related U.S. Application Data

(63) Continuation-in-part of application No. 14/464,450, filed on Aug. 20, 2014, now Pat. No. 9,472,100.

(51) Int. Cl.
*G08G 1/123* (2006.01)
*G08G 1/01* (2006.01)

(52) U.S. Cl.
CPC ..................................... *G08G 1/01* (2013.01)

(58) Field of Classification Search
CPC ............. G06K 7/10009; G06K 7/10366; G06K 7/10108; G06K 7/10356; G06K 7/0008; G06K 7/10079; G06K 17/0025; B07C 3/00; G01S 13/75; G05B 19/41865; G05B 2219/31296; G05B 2219/31442; G05B 2219/32097
USPC ............... 340/988, 539.26, 438, 506, 989, 340/991–994, 995.17, 539.13, 572.1–572.9, 340/588
See application file for complete search history.

(56) References Cited

U.S. PATENT DOCUMENTS

| | | | | |
|---|---|---|---|---|
| 7,571,036 B2* | 8/2009 | Olsen | ................. | B60R 25/1004 180/287 |
| 8,848,608 B1* | 9/2014 | Addepalli | ............. | H04W 4/046 370/328 |
| 2003/0187857 A1* | 10/2003 | Ford | ...................... | G06F 9/5011 |
| 2005/0275533 A1* | 12/2005 | Hanhikorpi | ............ | G01D 5/243 340/539.26 |
| 2007/0050240 A1* | 3/2007 | Belani | ..................... | G08G 1/14 705/13 |
| 2010/0069035 A1* | 3/2010 | Johnson | ................. | H04W 4/02 455/404.1 |
| 2010/0142448 A1* | 6/2010 | Schlicht | .................. | H04W 4/20 370/328 |
| 2011/0055438 A1* | 3/2011 | Nakagawa | ............ | G06F 11/073 710/33 |

* cited by examiner

*Primary Examiner* — Daniel Previl
(74) *Attorney, Agent, or Firm* — Elan IP Inc.

(57) ABSTRACT

There is a system for queue-based processing of RFID locating and sequencing at a site comprising one or more queues that are maintained and updated as locating and sequencing occurs, to ensure that out of sequence, or other complex processing, does not render inaccurate the locating and sequencing.

16 Claims, 10 Drawing Sheets

METHOD AND SYSTEM FOR QUEUE-BASED PROCESSING OF RFID LOCATING AND SEQUENCING EVENTS

FIELD OF THE INVENTION

The present invention relates generally to systems and methods for vehicle sequencing. More particularly, the present invention relates to locating and sequencing of vehicles or assets in one or more locating/parking areas or lanes.

BACKGROUND OF THE INVENTION

Attempts to locate vehicles for sequencing is a well-known problem. In order to efficiently assign drivers to vehicles, and provide an efficient way to move vehicles in and out of parking lanes/lots, it is desirable to know precisely where those vehicles are. Precise knowledge includes physical locations (such as what parking spot they are in, which may include lanes and spots within lanes) and which vehicles they are in front of, behind, or beside.

Various approaches have been attempted to locate and sequence vehicles, including using GPS technologies. However, the accuracy of such approaches is often not granular or accurate enough (often mistaking which lane a vehicle may be in as lanes may be essentially directly beside each other) and is also only available when a GPS signal is available (which is often not the case when in an indoor parking lot, for example). Approaches using RFID have thus far proven unreliable in accurately determining locations, and have resulted in widespread failure when one or more locations of vehicles are incorrectly determined.

RFID approaches, and approaches where parts of the locating system are shared with other systems (such as databases or hardware) or rely on other systems (networks that are not dedicated, for example) introduce complications and the opportunity for improper processing (out of sequence receipt or processing of events, duplicate events, and the like).

There thus remains a need for systems and methods to locate and sequence assets, such as vehicles, at a site. Additionally there remains a need for systems and methods that eliminate improper processing of locating of assets.

SUMMARY OF THE INVENTION

There is a method for accurate processing of a locating action event for an asset using queues, wherein a park queue, a parked queue, an unpark queue and a delay queue each may comprise one or more packets of one or more assets that have information about the asset, received from one or more gateways, that are separately processed and stored in a database by a system that can analyze packets to determine and process locating actions, wherein the system potentially processes packets and locating actions out of order based on one or more external factors or internal factors, the method comprising receiving a packet relating to the asset, determining, from the packet, a packet type, obtaining a result of a locating action, performed on the packet and based on the packet type, removing the asset from one or more inappropriate queues, if the asset is in one or more inappropriate queues, based on the packet type and the result, placing the asset in one or more appropriate queues based on the packet type and the result and updating the information about the asset in one or more appropriate queues based on the packet.

The receiving may be from an arrival queue that obtains all packets from the one or more gateways and may further comprise removing duplicate packets from the arrival queue and may be from one of the park queue or the delay queue.

The method may comprise, if the appropriate queue is the parked queue, the placing further comprises confirming that the packet has been processed in the database.

The method may comprise, if the appropriate queue is the park queue or the delay queue then repeating the obtaining, removing, placing and updating until the appropriate queue is not the park queue or the delay queue.

The locating action may be a parking calculation, the result may be a real parking spot, the packet type may be a stopped packet or a stationary packet, the inappropriate queues may be the delay queue and the unpark queue and the appropriate queue may be the park queue.

The locating action may be an unparking action, the packet type may be an in motion packet, the inappropriate queues may be the park queue, delay queue and the parked queue and the appropriate queue may be the unpark queue.

The method may further comprise removing the packet from the unpark queue after confirming that the packet has been removed from the database.

In a further aspect there is a system for accurate processing of a locating action event for an asset using queues, wherein a park queue, a parked queue, an unpark queue and a delay queue each may comprise one or more packets of one or more assets that have information about the asset, received from one or more gateways, that are separately processed and stored in a database by a system that can analyze packets to determine and process locating actions, wherein the system potentially processes packets and locating actions out of order based on one or more external factors or internal factors, the method comprising one or more assets configured to transmit packets to one or more gateways, one of more gateways configured to receive packets from one or more assets and transmit packets to a location management system, and a location management system further comprising a database, a park queue, a parked queue, an unpark queue and a delay queue that each may comprise one or more packets of one or more assets that have information about the asset, configured to: analyze, process and store packets in the database to determine and process locating actions, receive a packet relating to the asset, determine, from the packet, a packet type, obtain a result of a locating action, performed on the packet and based on the packet type, remove the asset from one or more inappropriate queues, if the asset is in one or more inappropriate queues, based on the packet type and the result, place the asset in one or more appropriate queues based on the packet type and the result, and update the information about the asset in one or more appropriate queues based on the packet.

The receiving may be from an arrival queue that obtains all packets from the one or more gateways and may further comprise removing duplicate packets from the arrival queue and may be from one of the park queue or the delay queue.

The system may comprise, if the appropriate queue is the parked queue, the placing further comprising confirming that the packet has been processed in the database.

The system may comprise, if the appropriate queue is the park queue or the delay queue then repeating the obtaining, removing, placing and updating until the appropriate queue is not the park queue or the delay queue.

The system may comprise, wherein the locating action is a parking calculation, the result is a real parking spot, the packet type is a stopped packet or a stationary packet, the inappropriate queues are the delay queue and the unpark queue and the appropriate queue is the park queue.

The system may comprise, wherein the locating action is an unparking action, the packet type is an in motion packet, the inappropriate queues are the park queue, delay queue and the parked queue and the appropriate queue is the unpark queue.

The system may comprise, wherein the location management system is further configured to remove the packet from the unpark queue after confirming that the packet has been removed from the database.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
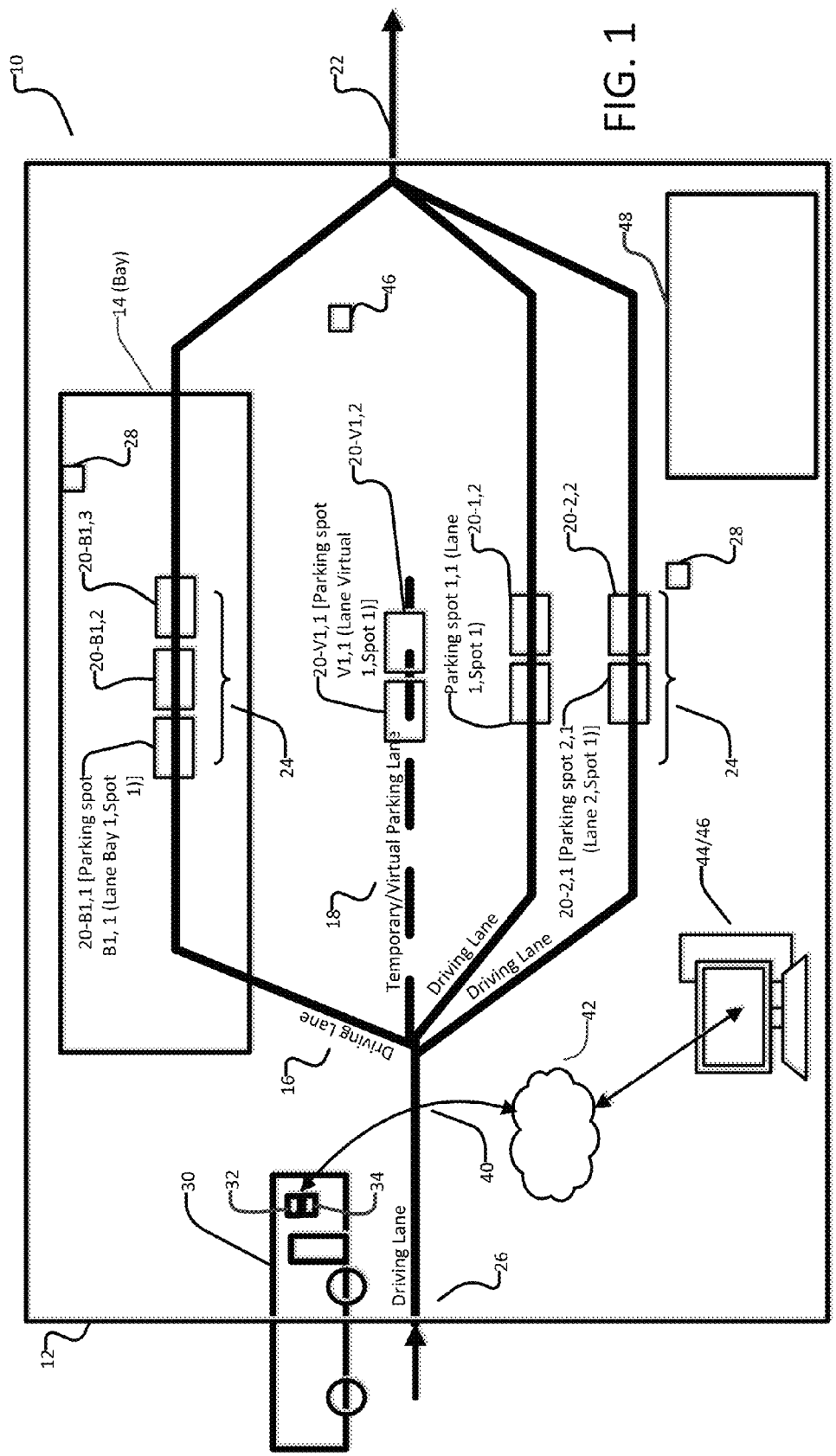
FIG. 1 shows a high-level architecture of a system for RFID based vehicle locating and sequencing according to an embodiment of the invention.

FIG. 1 shows a high-level architecture of a system for RFID based vehicle locating and sequencing according to an embodiment of the invention comprising system 10 further comprising one or more vehicles (moveable assets) 30, each further comprising tag 32, site 12 (having an entrance 26 and an exit 22), further comprising bay 14, one or more driving lanes 16, one or more temporary or virtual lanes 18, one or more parking spots 20, one or more reference tags 28, mobile data terminal 34, gateways 46, and location management system 44, asset 30 further comprising asset tag 32, boundary/parking zone 48, and communication network 42.

Site 12 may be any location where moveable assets need to be located and sequenced. Examples may include bus depots, vehicle storage sites, shipping container storage areas (including on ships or on land), and the like. Site 10 may comprise outdoor areas and/or indoor areas in which moveable assets may be placed or kept, requiring locating and sequencing. Site 12 may have at least some areas where GPS signals are not available.

Site 12 may be a location at which users of system 10 would like to track assets 30 (such as the detailed and exaction location or placement of assets 30). Site 12 may be a location where assets 30 are stored, or may be another location of interest to system 10. Site 12 may be a physically bounded area, with only a limited number of entry/exit points such as entrance 26 and exit 22. Alternatively, site 12 may not be physically bounded but only be a defined area of interest for system 12, for example defined by streets or geographic coordinates. In a transit application, for example and as shown in FIG. 1, site 12 may be or include a transit bay 14 where assets 30, potentially transit vehicles, go for maintenance and storage when they are not being used, driving lanes 16, boundaries 48, parking lanes 24 (which may be in bay 14, site 12, or may be virtual and/or made up of virtual parking spots 20-V).

Moveable assets 30 (or simply 'assets') may be vehicles (such as buses, trains, streetcars or fleet vehicles) or other moveable assets. Moveable assets 30 may be parked, for example when they are not in use, in site 12. Assets 30 may enter site 12 via entrance 26 and may then be parked in a parking spot. The owner/operator of asset 30 and/or site 12 may want to know the location of each asset 30 (for planning and future use purposes, such as to organize how to effectively put the asset back in use during the next day, according to a bus schedule for example). The location of an asset 30 may be the parking spot 20 the asset is in. The location may be determined via communications between asset 30, other assets 30, gateways 28, and location management system 44.

Asset 30 comprises mobile data terminal (MDT) 34 thereon or therein, though possibly being removable therefrom. MDT 34 may be removably attached to asset 30. MDT 34 may be computing devices that may take user input (such as keystrokes, clicks, touch inputs, and the like) and provides the user interface to functionality relating to, for example, the provision of transit services, driver or vehicle evaluation, and acceleration monitoring, and interacting with location management system 44 and the software located thereon. MDT 34 may have software running thereon to accept inputs as described herein, provide outputs as described herein, and communicate with other elements of system 10 as described herein. MDT 34 may have features of many tablets, smartphones, rugged PCs, and the like, such as one or more screens, memory, processors, cameras, communication modules (Bluetooth, RFID, cellular, WiFi, NFC, etc), and user inputs (touchscreens, buttons, etc).

MDT 34 may be able to communicate with other elements of system 10 (such as ATs 32 located thereon, or nearby, RTs 28, location management system 44 and the like), for example by communication network 42, or directly such as may be the case with other systems of vehicle 14. One exemplary MDT 32 may be Ranger 4™, made by Trapeze Software™.

Assets 30 may further comprise RFID asset tag 32 (referred to herein interchangeably as "tag 32", "asset tag 32" or "AT 32"). Tag 32 may communicate via RFID (or similar communication that allows local communication, including in various frequency bands as required) with other assets 30, gateways 28, and location management system 44 (that may have or be RT 28). Asset 18 may comprise other components and systems (not shown) including, but not limited to, electrical, mechanical and computer systems and sensors 22, various of such systems requiring or being capable of monitoring.

Tags 32 may be located thereon or therein, and may be removably attached. Tags 32 may operate in one or more "states" that govern their functioning. Tags 32 may transmit a beacon signal for a particular duration (transmission duration) every few seconds (or other transmission interval) and may listen for other signals for a particular duration (reception duration) every few seconds (reception interval). The location of asset tag 32 on asset 30 may be used to optimize communication ranges, reduce power consumption, and increase the ease of locating and sequencing (for example, placing tag 32 at the front of asset 30 may be more helpful than placing it somewhere between the front and back; and placing tags 32 at the same general location on each asset may also be assistive). Each asset 30 may have one or more tag 32 (such as the front of asset 30 and at the back of asset 30). In one embodiment asset 30 that is to be sequenced has a tag 32 on two opposing sides of asset 30 (ie the front and back or two sides) while assets 30 that are to be stacked may require two pairs of opposing sides (ie front and back, top and bottom). Tag 32 may be able to retrieve and/or determine information relevant to asset 30 (status information), for example its location or information from other components (not shown) of assets 30, site 12, or gateways 28, for example from one or more sensors, and transmit that information to other assets 30, gateways 28, or location management system 44 when they are within range, allowing asset 30 to communicate with system 10 (for example providing status information to location management system 44) to provide the functionality described herein. ATs 32 (and RTs 28) may comprise a processor, memory or storage, and other features typical of RFID tags and gateways, that may allow accomplishing of functionality described herein.

Asset tag 32 may further comprise a plurality of sensors, or be operably connected to sensors, that allow it to gather information regarding asset's 30 status. Each of such sensors may be operably connected to tags 32.

Parking spots 20 may substantially be any parking spot in site 12. Parking spots 20 may be pre-determined or ad-hoc (for example just being where asset 30 stops), may be part of a parking lane 24 or separate, may be in a bay 14 or anywhere else in site 12, and may be a virtual parking spot 20-V. Virtual parking spot 20-V may be created or used when the location of an asset does not appear to correspond to another parking spot 20, such that location management system 44 has not conclusively determined asset's 30 location. Each parking spot 20 may be uniquely identified or identifiable in computing system 44. Many conventions for identifying may be used, but in one example parking spots may be described as being in bay 14 ("B"), virtual (V) or regular (no designation), and assigned a unique lane number and spot number within the lane.

Parking spots 20 may apply where assets 30 are vehicles. In other embodiments (such as for storage containers), parking spots 20 may be storage locations or another equivalent term. Of course parking lanes may then be similarly replaced. However, despite the differences in nomenclature and organization of places to locate and sequence assets, aspects of the present invention may be tailored to accomplish locating and sequencing of assets 30.

Driving lanes 16 may allow assets 30 to drive (or be driven) through site 12 in order to arrive at a parking spot 20 or exit 22. Driving lanes 16 may become parking lanes 24 at some point in site 12, and may return to driving lanes 16 (and this may occur through the day as assets 30 are driven out of site 12). Driving lanes 16 may have one or more configurations that may be set up, for example, in central management system ("CMS") 44. Those may indicate what types of assets 30 should be in that lane or parked in that lane, and may provide further parking hints (as described herein). Virtual lane 18 may be made up of one or more virtual parking spaces, generally in a row or line. Virtual lanes may be used, for example, where multiple buses are determined to be in a row, but system 10 cannot determine which actual lane they are in (hence a virtual lane is used so as to indicate that such buses are in a row, but that they are not in a known lane yet).

Reference tag 28 (referred to herein interchangeably as "reference tag 28" or "RT 28") communicates via RFID with other gateways 46 and tags 32. RTs 28 may be similar to ATs 32 but may not change states. This may be accomplished, for example, by turning off an embedded motion sensor—not shown—which means states do not change. State changes may not be required by RTs as RTs 28 may be connected to a power source and thus conservation of battery power may not be important. To do so, RT 28 may initiate communication or tag 32 may initiate communication. RT 28 may transmit an RFID communication signal (shown as line 40) that 'awakens' RFID tag 32 from a 'sleep' or 'wait' state (an "awaken signal"), for example if the transmission matches requirements of a particular RFID tag 32. RFID tag 32 may then transmit its information (such as sensor information as described herein), for example to gateway 46. RT 28 may receive transmissions from one or more asset tags 32 via RFID communications and provide those transmissions to location management system 44 via communication network 26 (such as to perform operations, for example to monitor asset 30). RTs 28 may be placed throughout site 12 so that they can communicate information with assets 30, and provide/gather information assisting in locating and sequencing assets 30. In one embodiment RTs 28 may be scattered in boundary (or parking zone) 34 and one in each bay 14, in lanes you have at front and then may put RTs at prescribed intervals down lane say several bus lengths, generally by walkways or driving lanes or something that crosses your parking lane. By way of example, RT 28 may be placed proximate to the first and last parking spot in each parking lane 24, parking spot 20, or other location where assets 30 sometimes stop. RT 28 may also be placed at entrance 26 and exit 22 to assist in determining when asset 30 has entered or exited site 12 (ie placing RTs 28 at a chokepoint). In one embodiment for lanes, RTs 28 may be located at the front of each lane and periodically throughout lane (by distance or geographic items like fire lanes, but generally where the front of a bus would stop). For adjoining lanes that are side by side, RTs 28 may be similarly placed in each lane. Spacing may also be prescribed by legislation, for example to allow emergency responses. RTs for discrete parking spaces 20 may be placed at the front of each space. For boundaries 48, RTs 28 could go either at or along the perimeter of boundary 48 or down the center of the boundary, depending on how they park or if there's an immediately adjacent zone that needs to be clearly differentiates (for example where one boundary 48 is for tire assets 30 requiring tire inflation, and another boundary 48, immediately adjacent and not physically separated, is assets 30 requiring maintenance).

It is to be understood that any elements of system 10 that are called "tags" (such as tag 32, RT 28, and the like) may be tags in the sense that they may generally be able to receive and transmit via RFID. Of course all such elements may simply be readers. Hence tags (such as RT 28 and AT 32) may generically be referred to as nodes, where nodes may be either tags or readers.

Gateways 46 may be similar to RTs 28 and further able to bridge the communication between RTs 28 and tags 32 into other networks (such as communication network 42)—essentially acting as a gateway between two modes of communication that otherwise may not inter-communicate.

Central management system (also referred to herein as location management system) 44 may be a component of system 10 that provides functionality for users relating to one or more assets 30, such as to operate one or more transit services for a fleet of assets 30. Such functionality may include tracking the location and sequencing of assets 30, scheduling assets' use, diagnosing any issues with asset 30 that may require servicing, and scheduling any service work that may be required for asset 30. Central management system 44 may compile information from one or more gateways 14 or assets 30, via communication network 42 or RFID, with other information, for use in providing functionality of system 10 and location management system 44. Central management system 44 may be implemented via one or more pieces of software and may be operated by one or more users. Though it is shown in the figure as one computer, it can be composed of one or more computing and data storage devices and its functionality can be split up across these devices as appropriate. Of course location management system 44 may provide functionality not related to locating and sequencing. Central management system 44 is shown as within site 10, but may be located anywhere, including remote from site 10 (though possibly still accessible from within site 10). Central management system 44 may comprise components as described herein, and may include storage (to store data communicated with and between RTs 28 and ATs 32.

Components that communicate wirelessly in system 10, for example tag 32 and RT 28, have both a transmission range and a reception range. The transmission range denotes the distance which a component can transmit a signal to any other components within system 10, while the reception range of a component denotes the distance within which the component can hear signals. Components of system 10 are said to be in communicable range of each other when the reception range of a first component overlaps with the transmission range of a second, or the transmission range of the first component overlaps with the reception range of the second. When this is not true, the components are said to be out of communicable range of each other. If the reception ranges of both components overlap with the other component's transmission range, the components are said to be in bi-directional communicable range. Generally, the further two components are from each other, the weaker the signals exchanged may be—allowing gateways 28 and tags 32 to estimate the distance from, and importance, of signals being received. Each of RT 28 and AT 32 can configure their settings and components to adjust the strength of receiving and transmitting abilities, as required by the particular implementation.

Communication network 42 may enable communication of information between various components of system 10 including, but not limited to, RT 28 and location management system 44. Communication network 42 allows for a plurality of signals or information to be sent through its network simultaneously. Communication network 42 may be any public or private network, wired or wireless, and may be substantially comprised of one or more networks that may be able to communicate with each other. Communication network 42 may use a variety of mediums, such as cellular and WiFi networks. Communication networks 42 may not be required, for example, if components of system 10, such as RT 28 and location management system 44 are able to communicate directly, such as via RFID communications.

Figure 2:
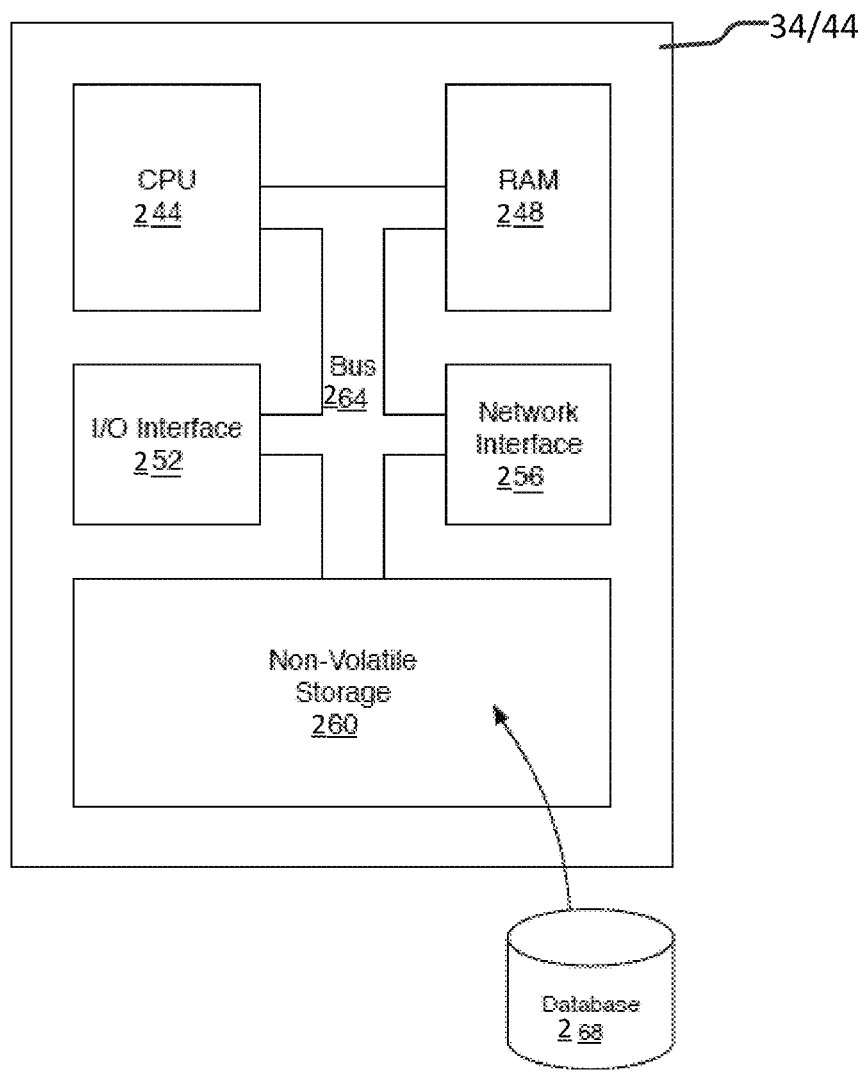
FIG. 2 shows a number of components of aspects of a system according to an embodiment of the invention.

FIG. 2 shows a number of components of location management system ("LMS") 44 (and MDT 34) in FIG. 1. As shown, location management system 44 has a number of components, including a central processing unit ("CPU") 244 (also referred to simply as a "processor"), random access memory ("RAM") 248, an input/output interface 252, a network interface 256, non-volatile storage 260, and a local bus 264 enabling the CPU 244 to communicate with the other components. CPU 244 executes an operating system and programs that provide the desired functionality. RAM 248 provides relatively-responsive volatile storage to CPU 244. The input/output interface 252 allows for input to be received or provided from one or more devices, such as a keyboard, a mouse, a touchscreen, etc., and enables CPU 244 to present output to a user via a monitor, a speaker, a screen, etc. Network interface 256 permits communication with other systems for receiving itinerary planning requests and for providing itinerary responses, in the form of web pages. Non-volatile storage 260 stores the operating system and programs, including computer-executable instructions for itinerary planning During operation of location management system 44, the operating system, the programs and the data may be retrieved from the non-volatile storage 260 and placed in RAM 248 to facilitate execution.

Figure 3:
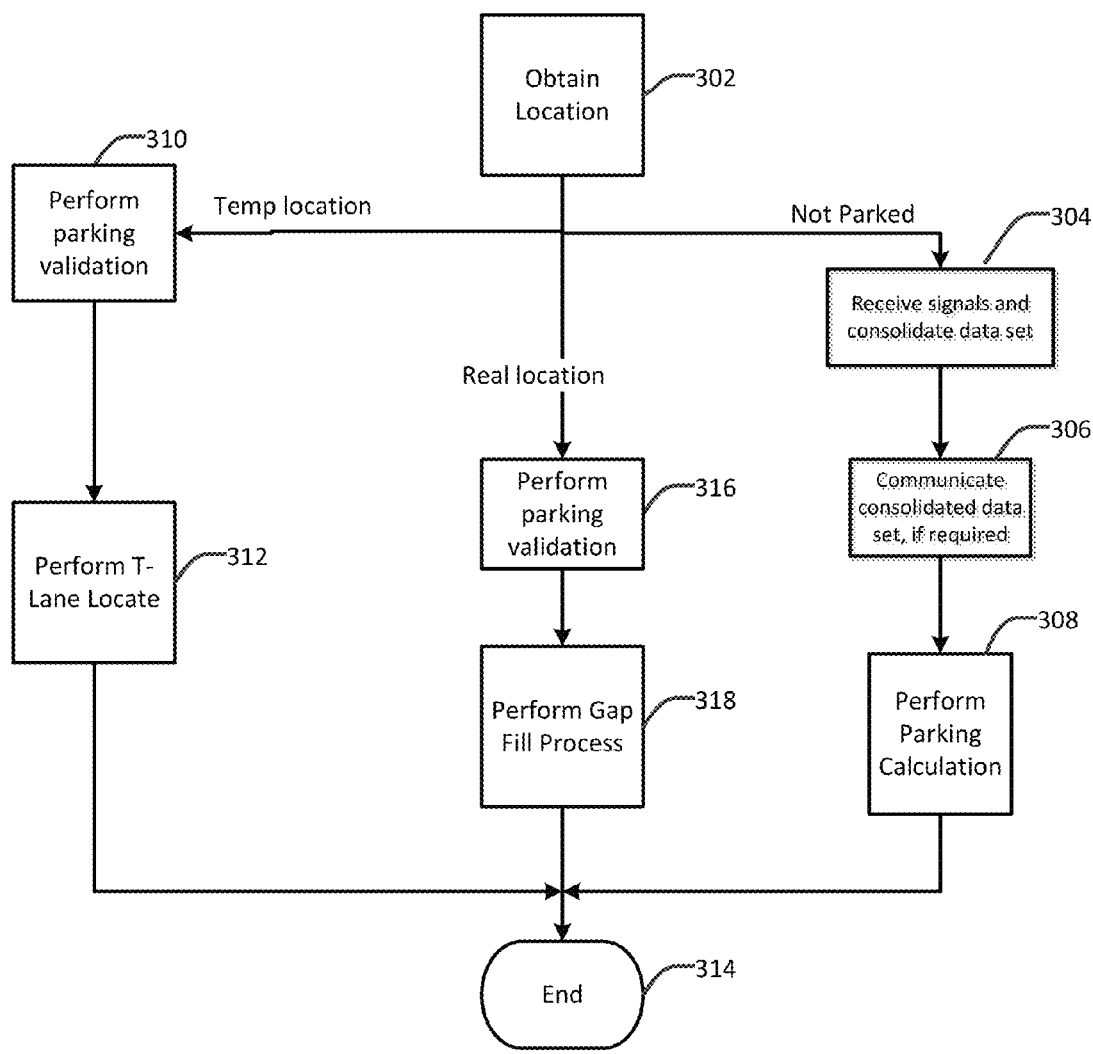
FIG. 3 shows a method for locating assets according to an embodiment of the invention.

FIG. 3 shows a method 300 for locating and sequencing stopped assets according to an embodiment of the invention.

Method 300 begins at 302 where a location is obtained for asset 30 (ie a prior parking result). This may be done by LMS 44, for example looking up whether the particular asset 30 has a stored location (which may be a parking spot, for example). A request to obtain location may be triggered in many different ways, and may depend on what state asset 30 is in (a stopped trigger, a motion trigger, or a stationary trigger, that may be initiated by an accelerometer, not shown, in AT 32), for example based on timing or motion detection, powering on or off of an asset 30, other systems of asset 30 (such as systems that may be connected to an OBD-II computer), and the like. For example if asset 30 is in a stationary state an obtain location trigger may be infrequently triggered (or not at all), in a stopped state triggers may occur every few seconds until the asset 30 is in a stationary state. Of course many approaches to determining when to obtain a location are possible.

If there is no location obtained at 302 then method 300 continues to 304. At 304 signals are received by asset 30 into a signal data set and one or more signal consolidation rules are applied to obtain a consolidated signal data set ("CSDS").

Asset 30 receives any and all signals from ATs 32 (largely being other assets 30 somewhat proximate to asset 30, also referred to herein as pre-existing ATs) and RTs 28 (largely being reference tags somewhat proximate to asset 30) and gateways 46 that are in communicable range of asset 30. Asset 30 may not, initially ignore any such signals.

One or more consolidation rules may then be applied, generally by AT 32, to obtain a consolidated signal data set and avoid unnecessary communication from tag 32 (which may be desirable to conserve battery power). Generally the consolidation rules would be designed such that the consolidated signal data set reflects only the most meaningful signals that help locate and sequence asset 30. Exemplary consolidation rules may include (and may be combined as a set thereof):

1) Discarding tag data below thresholds, for example −75 dB, though the actual threshold would depend largely on the configuration of parking spaces, RTs, ATs, FCC or hardware implications/restrictions and other considerations and may generally be in the range of −40 dB to −120 dB;

2) Discard AT data>5 dB weaker than strongest AT (5 dB being configurable);

3) Discard RT data>5 dB weaker than strongest RT (5 dB being configurable).

After consolidating at 304, AT 32 may send the consolidated signal data set to location management system 44, optionally via gateway 46, for further processing at 306.

Figure 4:
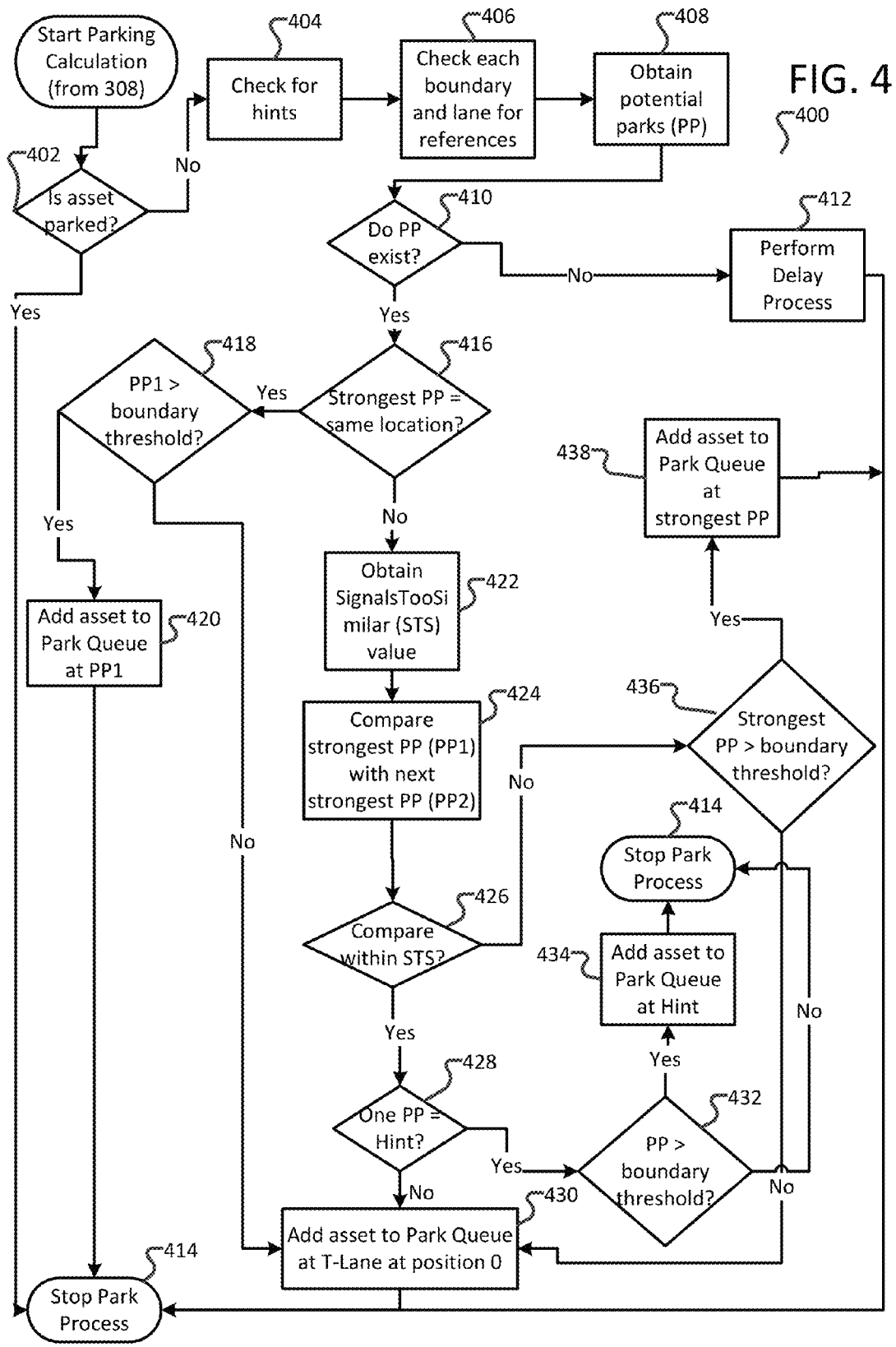
FIG. 4 shows a method for a parking determination according to an embodiment of the invention.

Method 300 then continues at 308 to perform a parking calculation—as described herein and with respect to FIG. 4. It should be noted, in beginning 308 and method 400, that such methods use the consolidated signal data set they are presented. However, the methods may be initiated based on one or more consolidated signal data sets that may relate to essentially the same event/issue/tag 32, for example if i) LMS 44 receives the same consolidated signal data set more than once ii) LMS 44 receives multiple consolidated signal data sets that are in fact related (for example if two more triggers occur within a short period of time) iii) any other aspect of system 10, or any components (not shown) that also leverage or affect system 10, introduce copies or delays, and iv) any combination of the above occurs. In such cases where there are effectively duplicate consolidated signal data sets a further filtering of consolidated signal data sets may occur at LMS 44, either prior to or during methods 400/500/600/700, to avoid processing duplicates (such as by looking at time stamps that may be part of the consolidated signal data sets, time of receipt by a gateway, content of the different consolidated signal data set, and the like).

If the location is a real location (such as a real parking spot, in a lane or otherwise, or in a boundary) then method 300 continues to 316 to perform a parking validation and then a gap fill process at 318—both as described herein. If the location is a temporary or virtual location (such as a virtual parking spot) then method 300 continues to 310 to perform a parking validation (which may be substantially the same as parking validation 306) and then a t-lane locate at 312—both as described herein. Method 300 then ends at 314 until a location is to be obtained again.

From 308 method 300 continues to method 400 in FIG. 4. Method 400 determines, or attempts to determine, where asset 30 is located in site 12. Of course the analyses herein are exemplary and others, including combinations of those described herein and related analyses, may be considered. The order of the analyses may also be altered, for example to reduce processing. Further, although various analyses and potential parks are described herein, different analyses and potential parks may result in different confidence about the parking calculation for asset 30 and may still be used. Analyses may be based on the consolidated signal data set, other information from one or more of asset 30, location management system 44, ATs 32 and RTs 28 (such as parking spots that are currently full, spots that have been assigned, closest parking spots, spots that fit certain vehicles only, and the like).

Method 400 begins at 402 where if asset 30 is parked then method 400 ends. If it is not parked then method 400 continues at 404 to check for hints.

At 404 hint data (independent indicators) is checked. Hint data may include:

1. a lane that location management system 44 has indicated to asset 30 it should park in (for example where location management system 44 sent an intended lane to MDT 34 and MDT 34 displayed this lane so that the operator of asset 30 could park asset 30 in the intended lane or where an LED sign, such as a chokepoint sign located at an entrance or a wayside sign), this may be because of configurations of parking lane 16 and asset 30 in question and eliminating parking spots/lanes that are outside bay 14 when a chokepoint has indicated that asset 30 is in bay 14 or because of known patterns for the next use of assets 30;
2. location management system 44 has indicated to asset 30 that it needs maintenance/fuel/washing/tire rotation/inspection and maintenance or other servicing is performed in one or more lanes or parking spots that may be in bay 14;
3. driver of asset 30 knows that they are only stopping at site 12 briefly and thus tells location management system 44 (for example via MDT 34) that it will stop in a boundary (or some other suitable location) so that it can exit quickly.

Checking hint data at 404 may be using consolidated signal data set data to confirm one or more hints, at 404 or when arriving at potential parks in 408. Thus, if consolidated signal data suggests (but is not conclusive perhaps) that asset 30 is parked in parking spot (R-1,3) and the independent indicator was the suggestion to park in lane R-1 then the independent indicator may be used to confirm the suspected (R-1,3) parking spot at 404.

At 406 method 400 collects information about site 12 that allows potential parks to be determined. For example, at 406 all RTs 32 in site 12 may be collected so that if consolidated signal data set includes a signal from one of them then a potential park can be determined. Similarly all ATs 32 and gateways 46 in site 12 may be collected. This collection may be static but may comprise at least a portion that is dynamic (such as ATs 32 of assets that are moving into and out of site 12). Failure to obtain all RTs/ATs/gateways may result in a failure to properly identify all potential parks and/or failure to rule out potential parks.

At 408 one or more potential parks (PP) are determined, to create a set of potential parks. Potential parks can be determined, for example, by considering or applying one or more potential park rules (or a set of potential park rules) to each signal in a consolidated signal data set (or even a signal data set):

1) Consolidated signal data set including a signal from an RT 28 located at the front of a lane, in the middle of a lane, or near a boundary, thus the asset (and AT thereon) is proximate to RT 28 (generally either in front of or behind RT 28 depending on the arrangement of AT on asset 30, and RT 28);
2) Consolidated signal data set including a signal from an AT 32 in a known/real position (such as a parking spot or in a boundary), thus the asset (and AT 32 thereon) is proximate to AT 32 (which may be a parked AT, pAT, and is generally either in front of or behind AT 32 depending on the arrangement of AT on asset 30, and AT 32);
3) Consolidated signal data set including a signal from an AT 32 in a virtual position, thus the asset (and AT 32 thereon) is proximate to AT 32 in a virtual (which may be a pAT, and is generally either in front of or behind AT 32 depending on the arrangement of AT on asset 30, and AT 32);
4) Consolidated signal data set including signals from one or more RTs 28 and ATs 32 that combine to suggest/trilaterate asset 30 to a location;
5) Note that some PPs may be eliminated at 408, for example if PPs suggest a parking spot outside bay 14 when a chokepoint has already indicated to location management system 44 that asset 30 is in bay 14 (for example a hint at 404 may assist in eliminating PPs).

Potential parks have a strength associated with them, which generally may be the strength of the signal leading to the PP—though other factors may affect the strength of the PP, such as reliability of the hardware providing the signal, the nature of the potential park or hardware, and the like.

At 410 if no PPs exist then at 412 a delay is performed. The delay may, for example, allow another asset 30 to finish its parking so that that AT 32 can subsequently be obtained at 406 and then asset 30 may be parked. This may occur, for example if asset 30 parks behind another asset that has not yet parked but once it does then a potential park will be obtained by asset 30 having a signal from the newly parked asset in its consolidated signal data set. After the delay at 412 the park process ends at 414 and method 300 will be recommenced as described herein.

At 410 if PPs exist then method 400 continues at 416 to execute one or more local analyses (analysis of the potential parks to arrive at a current parking result, such as 416/418/ 424/428/etc) of the potential parks. At 416 method 400 continues to see if the strongest PPs (configurable, but at least one PP) indicate the same location. If so method 400 continues to 418 determine if the strongest PP (PP1) is stronger than or exceeds a boundary threshold. The boundary threshold may be configurable and may depend on what type of PP it is. In one embodiment the boundary threshold may be −75 db.

If PP1 exceeds the threshold then asset 30 is added to a park queue at the location indicated by PP1 and method 400 ends at 414.

If PP1 does not exceed the boundary threshold then at 430 asset 30 is added to a park queue for a temporary or virtual lane at position 0 in that lane (as if asset 30 was to be conclusively put in a 'non-zero' position in a temporary lane then there would have been a PP associated with asset 30 in the temporary lane in front of asset 30). Method 400 then ends at 414.

Returning to 416, if the result is "no" then method 400 continues to 422 to obtain a Signals Too Similar (STS) value. This may be obtained from a configuration file or other source that may be part of location management system 44.

At 424 the strongest two (or more) PPs are compared and at 426 if the strength of the compared PPs are not within STS then at 436 the strongest PP is compared to a boundary threshold (the same or different from 418 or others). If the PP exceeds the boundary then asset 30 is added to park queue (for real locations) at the location of the strongest PP and method 400 ends. Otherwise method 400 continues at 430, which is as described herein.

Returning to 426 if the PPs are with STS then if one PP does not match a hint (ie confirms the hint of where the driver of asset 30 was told to park, for example) then method 400 proceeds to 430. Otherwise the PP is compared to a boundary threshold at 432 (again the same or different from other boundary thresholds herein). If the threshold is exceeded then asset 30 is added to the park queue at the location of the hint and method 400 ends, otherwise method 400 simply ends.

Method 400 ends at 414, and at such stage a current parking result will generally have been determined. A current parking result from method 400 may be a real parking spot (in a lane or not), a virtual parking spot (in a lane or not), a boundary, and the like. Of course a parking result may also be that there is no parking location (virtual, real, lane, boundary or otherwise) though that is generally if a particular asset 30 has not yet been through method 400 or most recently removed itself from parking (ie unparked).

When method 400 ends, method 300 ends until a further trigger for obtaining a location for a moveable asset occurs.

Figure 5:
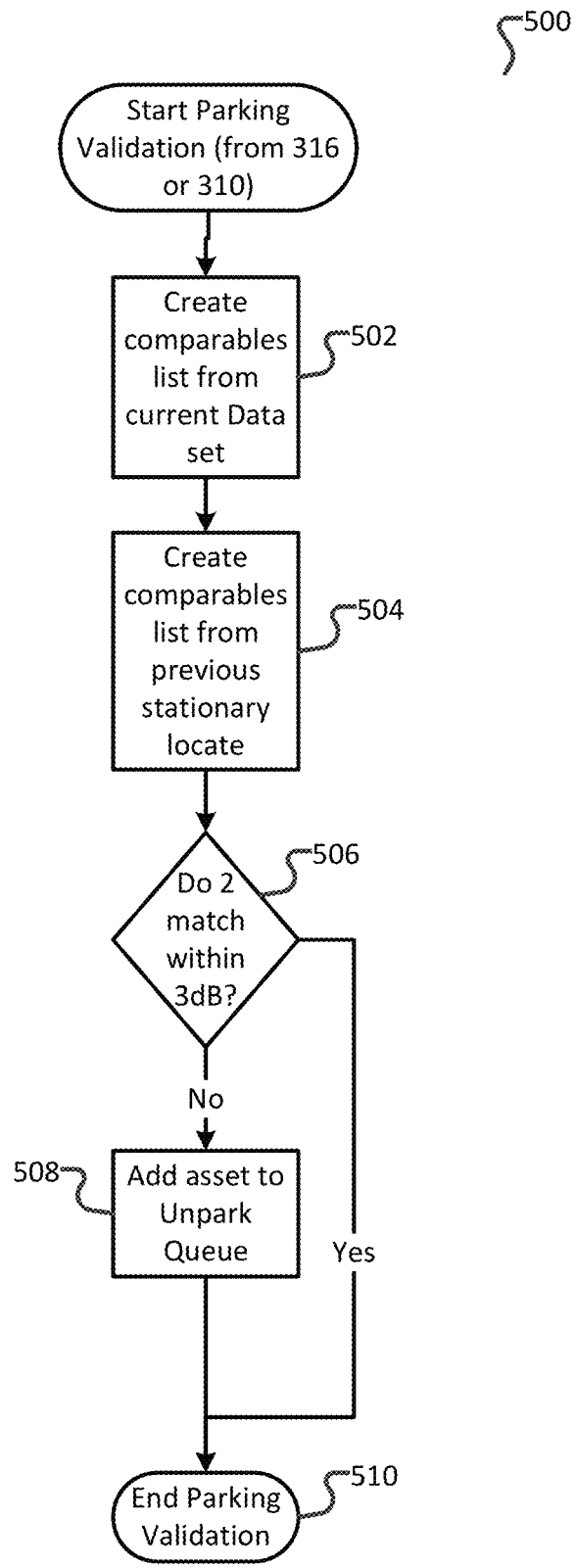
FIG. 5 shows a method for parking validation according to an embodiment of the invention.

Returning to method 300, if a real or temporary location is obtained at 302 then method 300 continues to perform parking validation, as described in method 500 in FIG. 5. Parking validation is performed to ensure that the obtained location is in fact still valid—as sometimes systems 10 may rely on other components or may be affected by other components such that unpark operations or park operations are not updated when a location is obtained at 302.

Turning to FIG. 5, method 500 begins at 502 where a comparables list is created from the current signal data set (which may be a raw signal data set of a consolidated signal data set). A comparables list as used herein is a list of signals from RTs 28, ATs 32s or gateways 46, received by asset 30 at a point in time. The current signal data set may already be in memory or may be obtained via processes akin to 304 and 306.

At 504 a similar list, a prior signal data set (raw or consolidated) is created from one or more previous location determinations. Such data may have been stored by location management system 44 during other iterations of method 300. At the end of 504 method 500 may have the two most recent signal data sets, a current and a prior, for asset 30.

At 506 a comparison between the comparables list to determine if asset 30 has moved. Different tests may be employed at 506 but in one embodiment if two items in the comparables list match within a threshold (3 db at present, but the threshold may be configurable) then method 500 determines that asset 30 has remained parked, sets the current parking result to be the same as the prior parking result (or simply does not change the prior parking result) and validation ends at 510. Also, some ATs and RTs may have moved and thus no longer provide a signal to asset 30. Thus a holistic approach to determining whether asset 30 has moved may be taken, as opposed to requiring the two lists to be completely the same, or contain the same signals or signal strengths. Otherwise asset 30 is added to an unpark queue at 508 then parking validation ends at 510.

Returning to method 300, if a real location had been determined then method 300 continues to 318 from performing parking validation.

Figure 7:
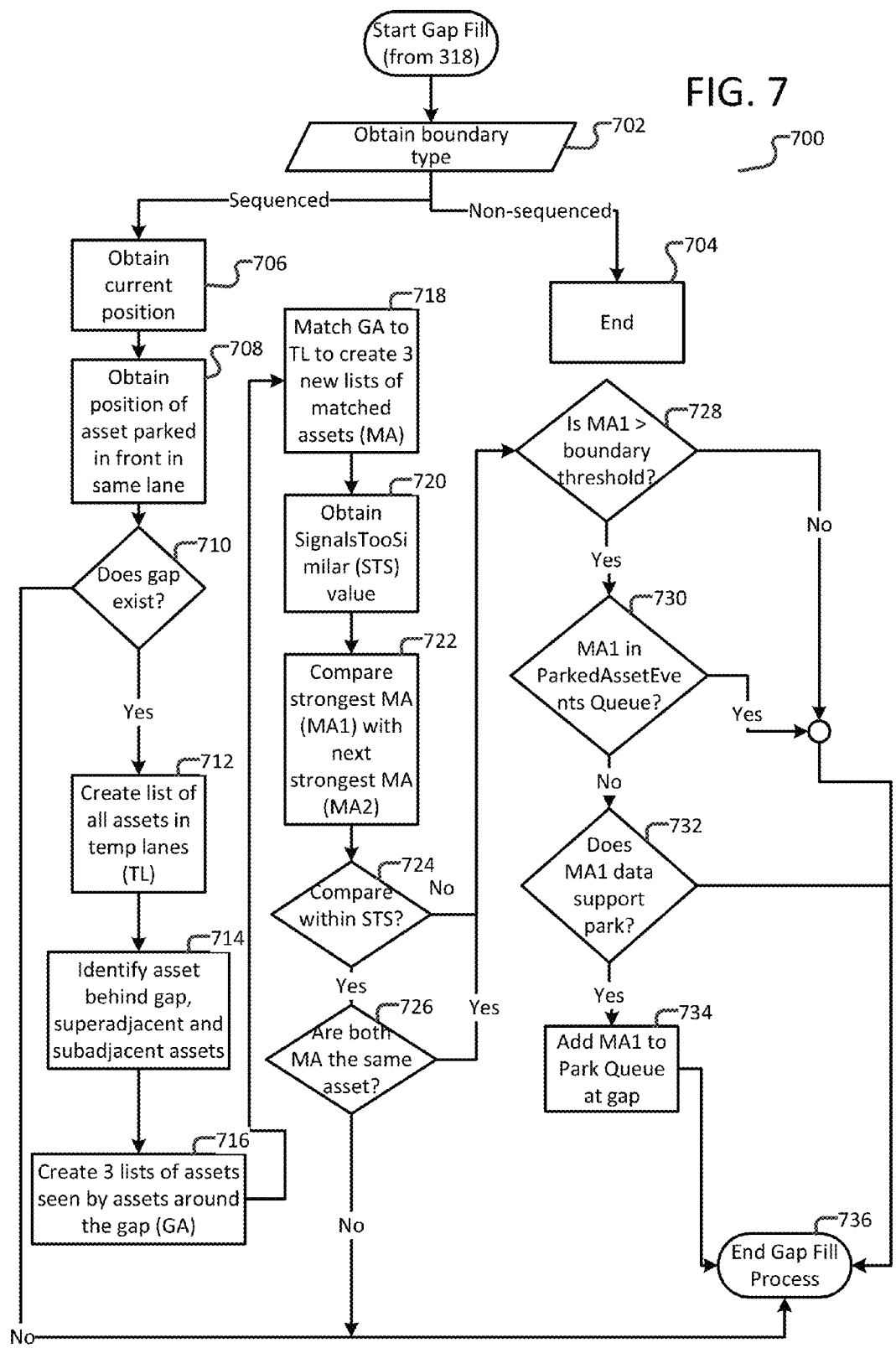
FIG. 7 shows a method for parking calculation for filling parking gaps according to an embodiment of the invention.

From 318 method 300 proceeds to method 700 in FIG. 7. Method 700 is for filling gaps that may arise in real lanes as a result of a failure to properly locate assets 30. At a high level method 700 may be attempting to identify assets 30 that are in temporary lanes but ought to be in real locations, such as gaps in lanes.

Method 700 begins at 702 to obtain a boundary type. If the boundary type is non-sequenced (such as if asset 30 is in boundary 48) then method 700 ends at 704. Otherwise method 700 continues to 706 to obtain a current position, which would be a real position, and a sequenced position. At 708 the position/location of another asset 30 that is in front of asset 30 in question is obtained.

At 710 if no gap exists then method 700 ends at 736. A finding of no gap would mean that asset 30 in front of asset 30 would be providing a signal to asset 30 that resulted in a PP that was determined to be the location for asset 30 (ie exceeding applicable thresholds and the like).

If a gap is identified then a list of all assets 30 in temporary lanes ("Temp Lane Assets") is created at 712.

Next at assets 30 are identified in a list that are behind the gap, superadjacent to the gap (ie in lanes with higher lane numbers than the current lane) and subadjacent to the gap (ie in lanes with lower lane numbers than the current lane) (such assets 30 being called "Gap Assets").

Then at 716 three lists of assets 30 that are proximate to the Gap Surrounding Assets are created (such being called "Gap Assets Neighbors")—one for each of "behind gap", "subadjacent to gap" and "superadjacent to gap".

At 718 three new lists are created to augment the three lists at 716 where Gap Assets Neighbors are kept in the corresponding new list if an asset is both a Gap Assets Neighbors and are in the Temp Lane Assets, such assets 30 being "Matched Assets" ("MA").

At 720 a Signal Too Similar ("STS") value is obtained (which may be the same as in other methods or may be different).

At 722 the strongest MA (MA1) is compared to the second strongest (MA2). If they are within the STS then method 700 continues to 726. If at 726 the two strongest MAs are not the same then method 700 ends at 736. If they are the same, or the comparison at 724 is not within the STS then method continues to 728.

At 728 if MA1 exceeds a boundary threshold (being the same or different from other such thresholds) then a check occurs whether MA1 is already in a queue to be parked. If not then a check is made whether MA1's data supports being parked based on its consolidated signal data set. If so then MA1 is added to a park queue in the identified gap.

If MA1 is lower than the threshold at 728, if MA1 is in a queue to be parked at 730, or if MA1's data does not support a park, then method 700 ends at 736.

Method 300 then resumes, awaiting for another trigger to obtain a location.

Figure 6:
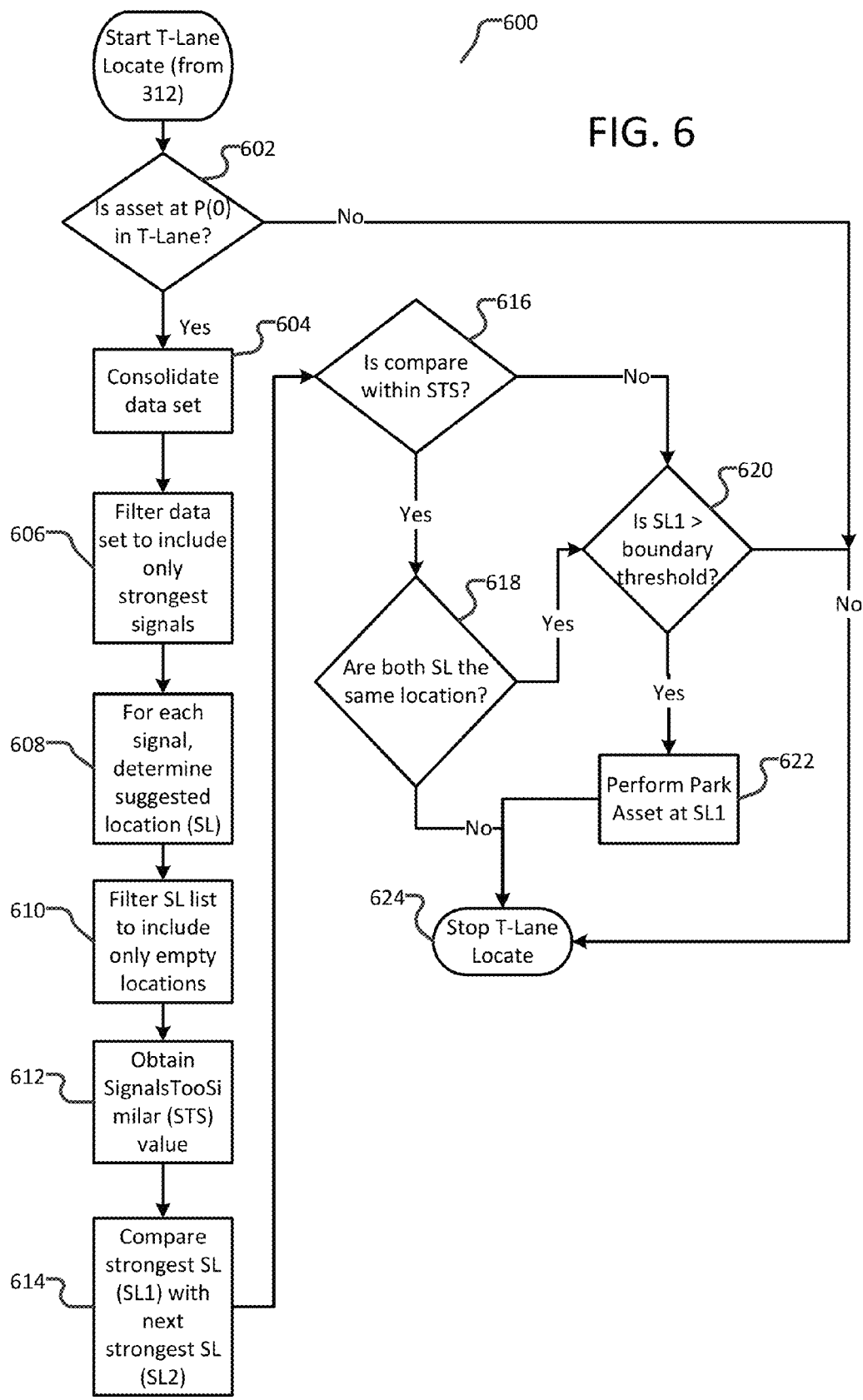
FIG. 6 shows a method for temporary lane locating of assets according to an embodiment of the invention.

If the obtained location or (current) parking result at 302 is a temporary lane or parking spot then method 300 proceeds to 310 as described herein, and then to 312 to perform a t-lane locate as described in method 600 in FIG. 6.

Method 600 in FIG. 6 is to attempt to locate asset 30 that is in a temporary lane, in a real spot. This may occur, for example, where it was unclear which lane asset 30 was in when it was being parked. It is preferable for assets 30 that are in real parking spots to be stored accurately as being in real spots.

Method 600 begins at 602 to determine if asset 30 is in position zero in its t-lane. If so method 600 proceeds to 604 and 606, which may be substantially similar to 304. If not, then asset 30 has already been located in a temporary lane and method 600 ends at 624.

At 608, for each signal in the consolidated signal data set a suggested location is determined.

At 610 the list of suggested locations is edited to only include empty locations. It is at this stage that a previous ambiguity may be corrected (where asset 30 may have been potentially placed in two parking spots). At 610 one of the two (for example) potential spots may be conclusively full.

At 612 a STS value (similar or different to others) is obtained and compared to the strongest suggested location (SL1) remaining at 614.

If the compare at 614 is within STS then at 618 if both SLs are the same then the strongest SL is compared to a threshold at 620, leading to parking asset 30 at SL1.

If the compare at 616 is not within STS then SL1 is compared to a threshold at 620 and asset 30 is parked at SL1 if the threshold is exceeded.

If the SLs are not the same, or the threshold is not exceeded at 620 then method 600 ends at 624.

It is to be understood that RTs and ATs are generally used herein to assist in determining where asset 30 is located and to sequence asset 30. As such, the number, characteristics, and locations of RTs and ATs within site 12 may be chosen to accomplish such locating and sequencing. In particular choices may be made to provide specific analyses as described herein, and specific analyses that increase the confidence of properly locating and sequencing assets 30.

Figure 8:
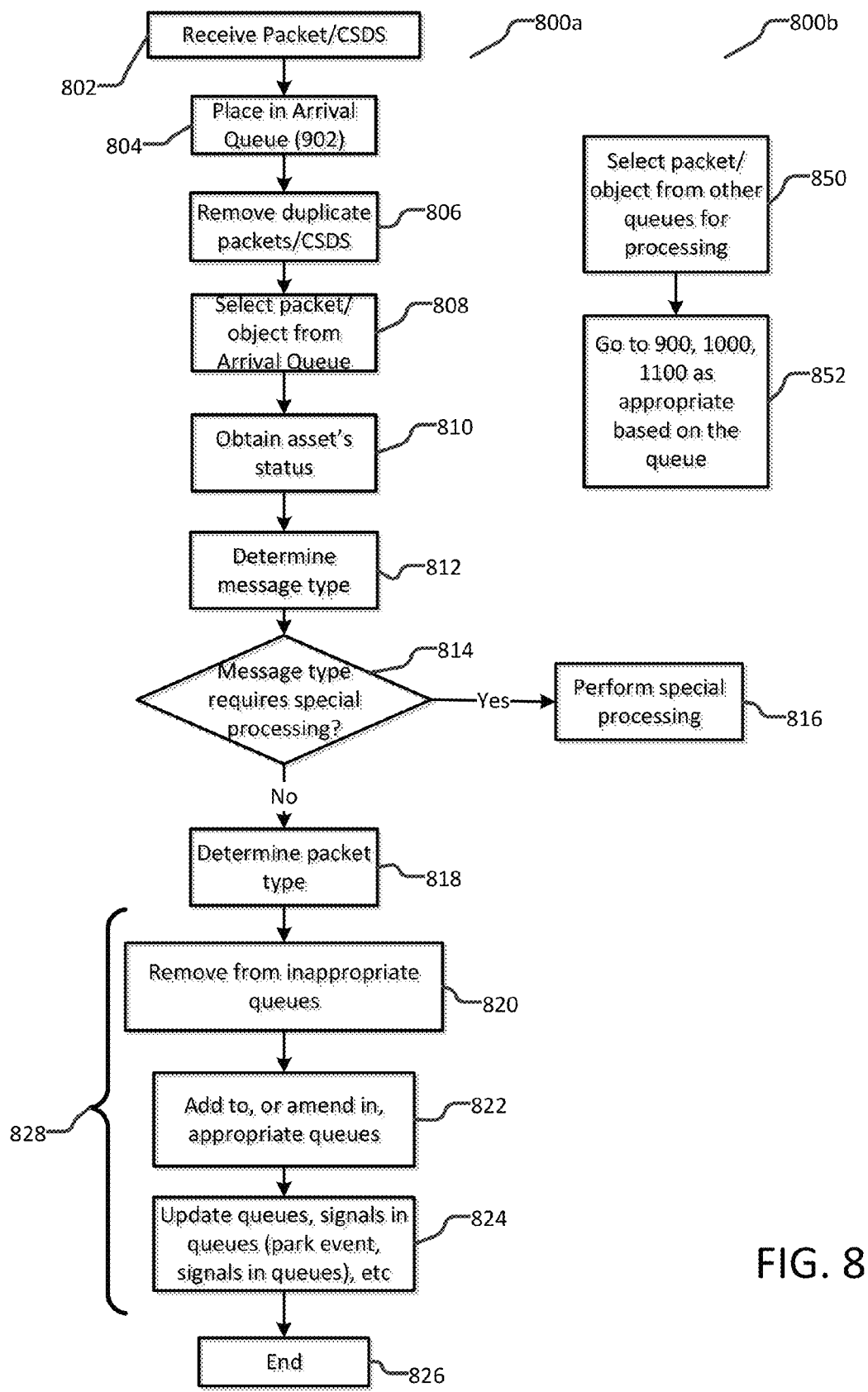
FIG. 8 shows a method for storage and tracking of data relating to parking an asset according to an embodiment of the invention.

FIG. 8 shows methods 800*a* and 800*b* for storage and processing of data relating to a locating action for a moveable asset. A locating action may be an action relating to the locating or sequencing of moveable assets, such as parking, unparking, filling gaps, validating, sequencing, and the like, as described herein.

Locating actions may be generally characterized as being externally-dependent locating actions ("EDLA") or internally dependent locating actions ("IDLA"). An EDLA may be any action related to locating asset 30 that requires interacting with parts of system 10 that may also be used by programs or functions that are not part of locating/sequencing. For example, if all of system 10 is used only for locating then it may be possible that no locating actions are EDLAs. Alternatively parts of system 10 may be used other than for locating. Locating management system 44 may be part of a larger system for servicing assets 30 (such as for scheduling, maintenance, monitoring, etc, of assets 30, such as Trapeze's TransitNow™). As such some of the data in system 10 (for example in storage 260 or database 268) may be accessed by other systems, resulting in variable processing times and variable processing orders of EDLAs. Of course if asset 30 parks, then unparks it is important that the park is processed or excecuted first, followed by the unpark. Where system 10 has external dependencies then parking and unparking may be EDLAs and if asset 30 parks, unparks and then parks anew, it is important that the three are all processed in the proper order to avoid causing a problem, or having asset 30 located in the wrong position (ie in the position specified by the first park). IDLAs typically have no external dependencies, though there may still be internal limitations within system 10 that make proper processing difficult, as described herein.

Locating actions may be processed improperly for a variety of reasons. Some of those reasons may be caused by external factors (external to system 10) or internal factors (part of system 10), including:

1) External factors: Essentially anything that is external to system 10 or that may be controlled by parties external to the owner/operator of system 10. Parts of system 10 may be controlled by other parties, or shared by other functionality. Communication systems may be provided by third parties. Transit agencies may use parts of system 10 for other purposes, as described herein. External factors may include network switches that combine communication from multiple networks that are backed up or are simply too busy, communication may be at different speeds or go through external software before arriving at, for example, a gateway.

2) Internal factors may include:
   a. Tags 32 may send CSDS that may be received by more than one gateway, hence duplicates are introduced into system 10, with the potential for being processed out of order;
   b. Vehicles may come to a stop in a lane out of order (ie a more forward vehicle may come to a complete stop after a vehicle behind it, resulting in the rear vehicle being confused by a signal from an unparked vehicle directly in front of it);
   c. One or more gateways may receive CSDS from assets, for example caused by different triggers, and/or gateways may have different numbers of CSDS to process. This may result in a exit chokepoint triggered CSDS being processed before a CSDS indicating motion has begun;

d. A signal can become 'lost', as it may become corrupt in the system 10, which can put the order out of sequence.

Returning to methods 800a and 800b, the two methods may occur substantially in parallel (after some period where only method 800a occurs as there are no objects/assets in the queues that are part of method 800b). Method 800a is a method for incoming packets from moveable assets to be ingested into system 10 and placed in the appropriate queues, optionally as one of a variety of object types, for subsequent processing. Method 800b is a method for processing the packets that may be in the form of one of a variety of object types.

Although method 800a and 800b may operate in parallel, they will now be described largely in series, for simplicity.

Method 800a begins at 802 where a packet is received by system 10, and generally at CMS 44. The packet may be placed in arrival queue 902 immediately upon arriving at CMS 44 from a gateway, for example after entering site 12 (for example via a choke point entry trigger). This may occur as tag 32 creates a packet to communicate its CSDS. The packet may include CSDS and may include other information, such as a message type (for example what trigger caused the packet, such as a chokepoint and the like), a packet type (for example indicating the state of the asset, such as stationary, stopped or in motion) a timestamp indicating, for example, when the packet was created, a packet ID (such as between 0-255, rolling over after 255, and generated by and on tag 32 such that packet 233 and 234, for example, were created successively), and tag ID.

At 804 the packet is placed in Arrival Queue 902.

There may be several queues used to implement embodiments of the present invention. In one embodiment, as shown herein, there are the followings queues: arrival queue 902, park queue 904, parked queue 906, delay queue 908 and validate queue 910. These queues may be structures of data that may be part of system 10, LMS 44 and may be stored and utilized by CPU 244, RAM 248 and non-volatile storage 260. Queues may operate in a FIFO fashion or some other pattern, or may be entered and exited in non-patterned ways, as described herein. For example, triggers may cause data to be placed in or removed from a queue. Arrival queue 902 may be where packets all start to be processed. Park queue 904 may be the queue of packets for assets that are to be parked, while parked queue 906 may be the queue of assets that are parked. Relating back to the underlying processing, packets that are in park queue 804 represent packets/assets that system 10 has logically determined are to be parked (such as via packet/asset having undergone a successful locating action, as described herein), but that have not yet been parked in system 10 (where, for example, being parked involves information being written into a database or some other storage, such as database 268 in non-volatile storage 260). Packets that are in the parked queue represent packets/assets that system 10 has logically determined are to be parked, and that have been successfully parked (where, for example, being parked involves information being written into a database or some other storage, such as database 268 in non-volatile storage 260 and that may be affected, or made erroneous, by external factors or internal factors). Packets that are in the unparked queue represent packets/assets that system 10 has logically determined are to be unparked, but that have not yet been unparked (where, for example, being unparked involves information being deleted from a database or some other storage, such as database 268 in non-volatile storage 260 and that may be affected, or made erroneous or obsolete, by external factors, internal factors, or subsequent packets). Delay queue 908 may be a queue for assets that are to be parked but a location cannot be determined (or only a virtual location can be determined) hence a delay is introduced in hopes that a location can be determined. Validate queue may be a queue for assets that are parked but need to be confirmed (for example by receiving a stationary packet that may be received some time after the asset is parked, or an unpark trigger is received and is to be validated).

At 806 the packet may be checked to see if it is a duplicate. This may involve comparing packet IDs and tag IDs, timestamps and packet types. Duplicates may exist, for example, where several stopped or stationary packets were created, or when one or more packets were received by more than one gateway. The packets in arrival queue 802 may be removed therefrom, and checked for duplication, from arrival queue 802 in a FIFO fashion, such that the packets are ordered based on arrival times and/or packet times.

If the packet is a duplicate then at 814 the packet is discarded. Otherwise, the packet is maintained in arrival queue 902, awaiting its turn to be processed.

At 808 a packet is selected from arrival queue 902. At 810 its status is obtained. This may be done, for example, by CMS 44 obtaining the asset ID from the packet, and searching for that asset with CMS 44. The particular asset 30 may be in CMS 44 as parked (real or virtual), in a delay queue, or not in CMS 44, for example.

Then at 812 a message type is obtained from the packet. A message type may indicate, for example, that the message is a chokepoint type, a tag acknowledgement, a tag presence detect, a locate message (indicating that a locating action should be performed), a squawk (a tag to gateway communication, that may not be heard by other tags, and may be on a different frequency than chirps), chirps (tag to tag communication that may not be heard by gateways), and the like.

If, at 814, the message type indicates special processing is required then method 800a continues to 816 to perform that processing.

In one example of a message type that requires special processing, a chokepoint gateway (that may have been identified as such by CMS 44) communicates a squawk that is heard by an asset 30 entering a site. Tag 32 hears the squawk, and is alerted that the gateway is a chokepoint. Tag 32 then assembles CSDS, sets the message type as "chokepoint", sets the packet type as "motion" (assuming asset 32 is moving) and transmits the packet. The chokepoint gateway presumably will receive the packet, pass it to CMS 44, where the nature of the chokepoint message will result in processing at 816 that ensures that the asset is not parked or placed in the park queue.

Returning to method 800a, if the message type does not require special processing then at 818 the packet type is determined. This may be by obtaining the packet type from the packet, and the packet type may indicate whether the asset is moving, stopped or stationary, for example.

It is to be understood that 810/812 and 818 may be done in substantially any order, or in parallel.

At this point, CMS 44 is ready to insert the packet into the proper queue(s) for it to be later processed. Of course packets, for particular assets 30, may be coming in at any time, from any number of gateways and the like. Thus it can be seen that both method 800a and method 800b are continuously operating and working together. Further, if the currently considered packet is placed in queue(s) it ought to be placed properly and any data (or other packets' data or location) that may be made dirty is removed or cleaned upon inserting the packet.

Thus at 820 the asset embodied in the contemplated packet is removed from queues that it should not be in. This determination can be quite complicated, and reference is made to Table 1-3 herein. Factors that may be involved, for each of 820/822/824 may include: the timestamp of the current packet/object as compared to other packets/objects relating to the same asset (ie simplistically it may be that if the current packet has a more recent timestamp then it should be inserted, otherwise it should not be), packet ID (which may be a proxy for timestamps or may otherwise be used to determine which queues are inappropriate), the asset's status, the message type, and the packet type, possibly along with other data in the packet. Examples will be further discussed herein.

At 822 the packets/objects for the asset may be added to an appropriate queue (if a packet/object relating to that asset is not presently in the required queue) or the information in the other packet/object may be amended (for example if the asset is in park queue 904 due to a previous stopped packet, and a new stopped packet or a stationary packet is received, having different signals/data/CSDS then the data may be updated). Again, this determination can be quite complicated, and reference is made to Table 1-3 herein.

Lastly, at 824, queues may be updated (such as by re-ordering objects in the queues so that the queues remain chronological given that timestamps may have been updated, for example at 822), signals in queues may be updated (for example if these did not occur at 822) and other processing may occur, as described herein, and with reference to Tables 1-3.

Tables 1-3 show one implementation of the logic for insertion of packets/objects into the proper queue(s), and removal from inappropriate queues. Implementing these tables may form 828 from method 800*a*. In the tables below, the "Asset Status" is retrieved by CMS 44, the "Current Queue(s)" is determined by CMS 44 looking at queues for the presence of the particular asset, and the other columns generally map to 820/822/824.

In one example from Table 1, a stopped packet is received. The asset is determined to be parked in a real parking spot already. It does not matter what current queues the asset may be in (hence N/A, as this does not alter the resultant steps in 820/822/824). The inappropriate queues are each queue except the parked queue (so if the asset is found in such queues it is removed, provided that the time stamp in the queue is not more recent than that in the currently examined packet).

TABLE 1

"Stopped" packet type logic

| Asset Status | Current Queue(s) | Inappropriate Queue(s) - 820 | Appropriate Queues - 822 | Updates/ Actions - 824 | Comments |
|---|---|---|---|---|---|
| Parked (real parking spot) | N/A | All except Parked Queue | Parked Queue | Update signals if applicable for object in Parked Queue (timestamp check) | |
| Parked (virtual parking spot) | N/A | Unpark Queue | Parked Queue, Delay Queue | Update signals if applicable (timestamp check) | |
| Not parked | N/A | Unpark Queue, Parked Queue, Delay Queue* (if the signals indicate it is not recent) | Park Queue, Delay Queue* (if it is already in and signals indicate it is recent) | Update signals if applicable (timestamp check) | |

TABLE 2

"Stationary" packet type logic

| Asset Status | Current Queue(s) | Inappropriate Queue(s) - 820 | Appropriate Queues - 822 | Updates/ Actions - 824 | Comments |
|---|---|---|---|---|---|
| Parked (real parking spot) | Parked Queue | All except Parked Queue | Parked Queue | Update object in Parked Queue (for example via method 500) | |
| Parked (virtual parking spot, currently head of virtual lane, Parking Calculation does not return a park event) | Parked Queue, Delay Queue | Unpark Queue, Park Queue | Parked Queue, Delay Queue | Update object in Parked Queue | Moving an asset from a virtual parking spot to a real parking spot should only happen if it is determined to be in a real parking spot and was at the front of a virtual lane. If not at the front of the virtual lane then when the asset at the front is moved then others parked behind will be moved as well. |
| Parked (virtual parking spot, Parking Calculation does return a park event) | Parked Queue, Not in Delay Queue | All except Parked Queue | Parked Queue | Update object in Parked Queue | |

TABLE 2-continued

"Stationary" packet type logic

| Asset Status | Current Queue(s) | Inappropriate Queue(s) - 820 | Appropriate Queues - 822 | Updates/ Actions - 824 | Comments |
|---|---|---|---|---|---|
| Not parked | In Delay Queue | All except Delay Queue | Delay Queue | Update object in Delay Queue | |
| Not parked | Not in Delay Queue | All | None | None | A stationary packet should not be received if the asset is not parked and not in the delay queue. |

TABLE 3

"Motion" packet type logic

| Asset Status | Current Queue(s) | Inappropriate Queue(s) | Appropriate Queues | Updates/ Actions | Comments |
|---|---|---|---|---|---|
| Parked (real parking spot) | Unpark Queue | All except Unpark Queue | Unpark Queue | Updates object in Unpark Queue | |
| Parked (real parking spot) - not in Unpark Queue | Not in Unpark Queue | All except Unpark Queue | Unpark Queue | Add object to Unpark Queue, and update object's time | |
| Parked (virtual parking spot) | Unpark Queue | All except Unpark Queue | Unpark Queue | Updates object in Unpark Queue | |
| Parked (virtual parking spot) | Not in Unpark Queue | All except Unpark Queue | Unpark Queue | Add object to Unpark Queue, and update object's time | |
| Not parked | Not in Delay Queue or Park Queue | All except Unpark Queue | Unpark Queue | Odd object to Unpark Queue | |
| Not parked | In Delay Queue | All except Unpark Queue | Unpark Queue | Remove from Delay Queue | |

Returning now to method 800b, an object (noting that generally packets will have become objects in the queues) is selected from a queue at 850. These may be from any queue herein, such as park queue, parked queue, delay queue, and unpark queue. Of course the exact order and way to select objects from various queues can vary tremendously and may depend on factors such as: processing power (including parallel processing capabilities), sensitivities inherent in the particular queue (ie that unparking is less crucial than parking), sensitivities for the particular implementation/client, and the like. In one embodiment one packet (for example the first packet in is taken out first) from each queue is taken out in order (ie switching between each queue). In a second embodiment the queues are all sorted such that the oldest packet is at the "top" of the queue and the oldest packet, from any of the queues, is removed and processed first. Of course the delay queue may store the original timestamp (possibly in combination with timestamps reflecting the times entering and/or exiting delay queue 908), which may not reflect some of the delays, and the method and selection of the next packet to process may take this into account.

Figure 9:
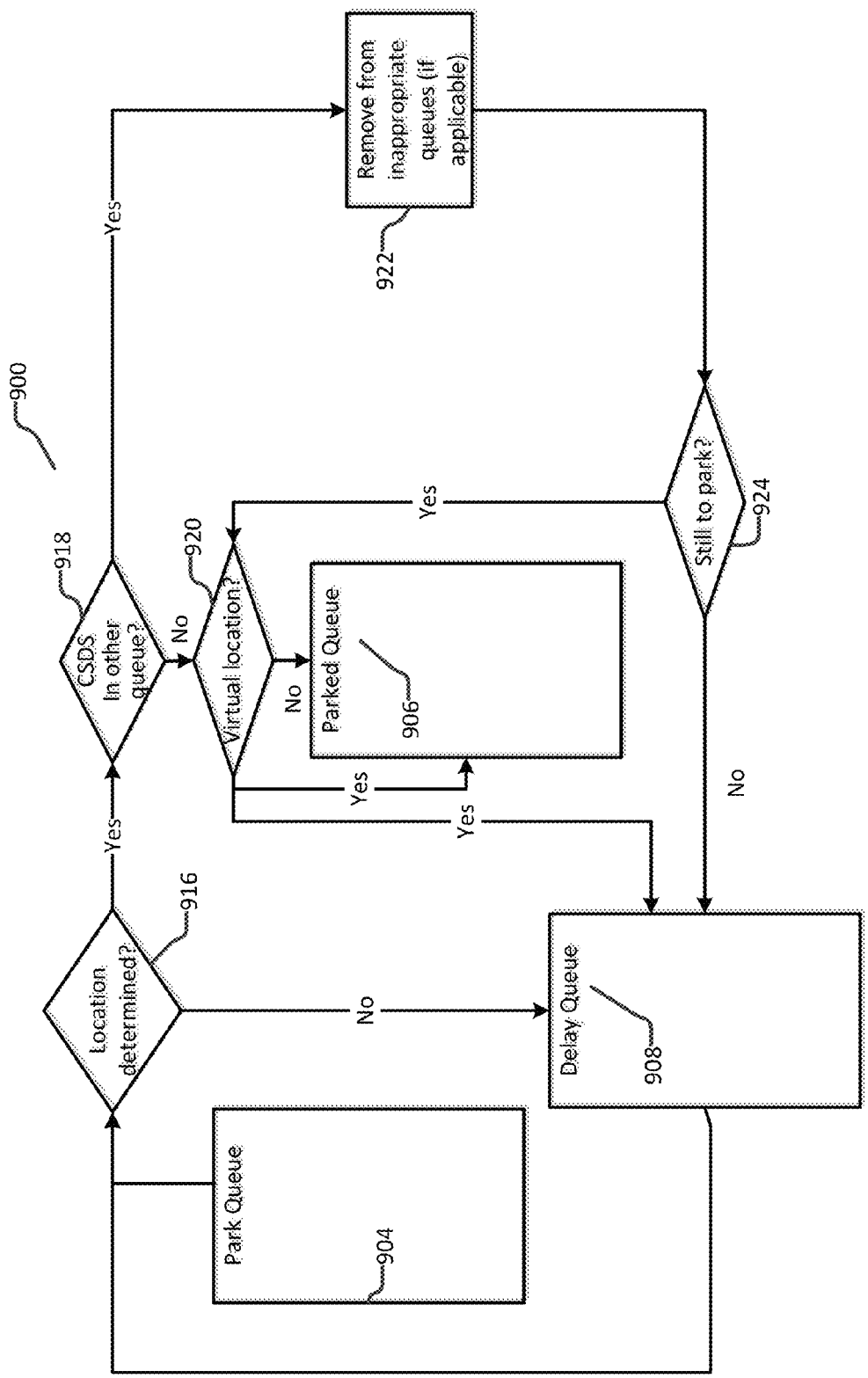
FIG. 9 shows a method for storage and tracking of data relating to parking an asset according to an embodiment of the invention.

FIG. 9 shows a method 900 for storage and tracking of data relating to parking an asset according to an embodiment of the invention. Method 900 begins with one or more packets/CSDS in park queue 904, ready to be parked.

Once in park queue 904, the packet/asset may remain until it is removed based on, for example, FIFO processing (or some other reason, such as described herein or with respect to method 800). Removal from park queue 904 may result in the asset going through location determination at 916, which may be substantially as described herein. Removal from park queue 904 may also result in a table of locations of assets (a "locate table") in RAM 248 (being part of the memory allowing methods to function—such locate table being the processing locate table) being compared to the locate table in database 268 (the storage locate table). Storage locate table may be deemed the reliable source and processing locate table may be updated to reflect this and ensure proper data is being used to locate the asset being removed from park queue 904. One reason the locate tables may not conform is that other parts of system 10 (or elements external to system 10, such as a yard manager application) may allow assets to be manually moved to accurately reflect asset locations.

If a location is not determined (ie there is no parking spot determined for asset 30) then the packet may be placed in delay queue 908.

Delay queue 908 is a queue that holds packets for further processing or re-processing. Essentially delay queue 908 may introduce a delay in processing so that whatever result or processing did not successfully occur may eventually successfully occur. In one example, delay queue 908 may receive a packet for asset 30 because a second asset 30, located in front of asset 30, has not come to a complete stop even though asset 30 has. This may result in asset 30 not having its location determined at 916.

Returning to 916 if the location is determined then at 918 a query is made whether the CSDS (or a related SDS or asset 30) is in another queue. If not then at 920 a query is made whether the determined location is a virtual location. If it is a real location then asset 30 is moved into the parked queue 906. If it is a virtual location then asset 30 is moved into the parked queue 906 and also into delay queue 908 so that asset 30 will be checked again to see if it has reached a real location such as by returning to 916.

Returning to 918 if the CSDS is in another queue then method 900 will continue to 922 to remove the CSDS from inappropriate queues, if applicable. For example, having determined a parking location it may be inappropriate for the CSDS to remain in a delay queue or unpark queue. Of course the other packets/CSDS in the other queues may need to be examined, for example to make sure that the currently contemplated packet is the most recent (hence removal from other queues is right). After 922 method 900 continues to 924 to determine if the asset should still be parked. If so method 900 will continue to 920 and proceed as described herein. Otherwise the packet may be moved to delay queue 908 to give asset 30 time to properly be processed (ie stop moving and be ready to park, etc). Of course this may result in the CSDS/asset 30 being removed from delay queue 908 before it is processed again (for example as per Tables 1-3). It is also possible that, at 918 CSDS may be in another queue but due to other factors (such as a timestamp in the other queue or queues) the presence in another queue may be ignored.

It should be further understood that, in moving from 920 into parked queue 906 (either as a real or virtual parking location) locate tables (processing and/or storage) may be updated. Asset 30 may not be placed in parked queue 906 until locate tables are updated, or they may happen in parallel. Further, there may be additional rules that must be followed before asset 30 is placed in parked queue 906, such as: a minimum time after a stationary packet has been received (configurable, but 3.5 minutes for example), receiving an acknowledgment from storage locate table that the location of asset 30 has been written, confirmation of removal from other queues, and the like.

Figure 10:
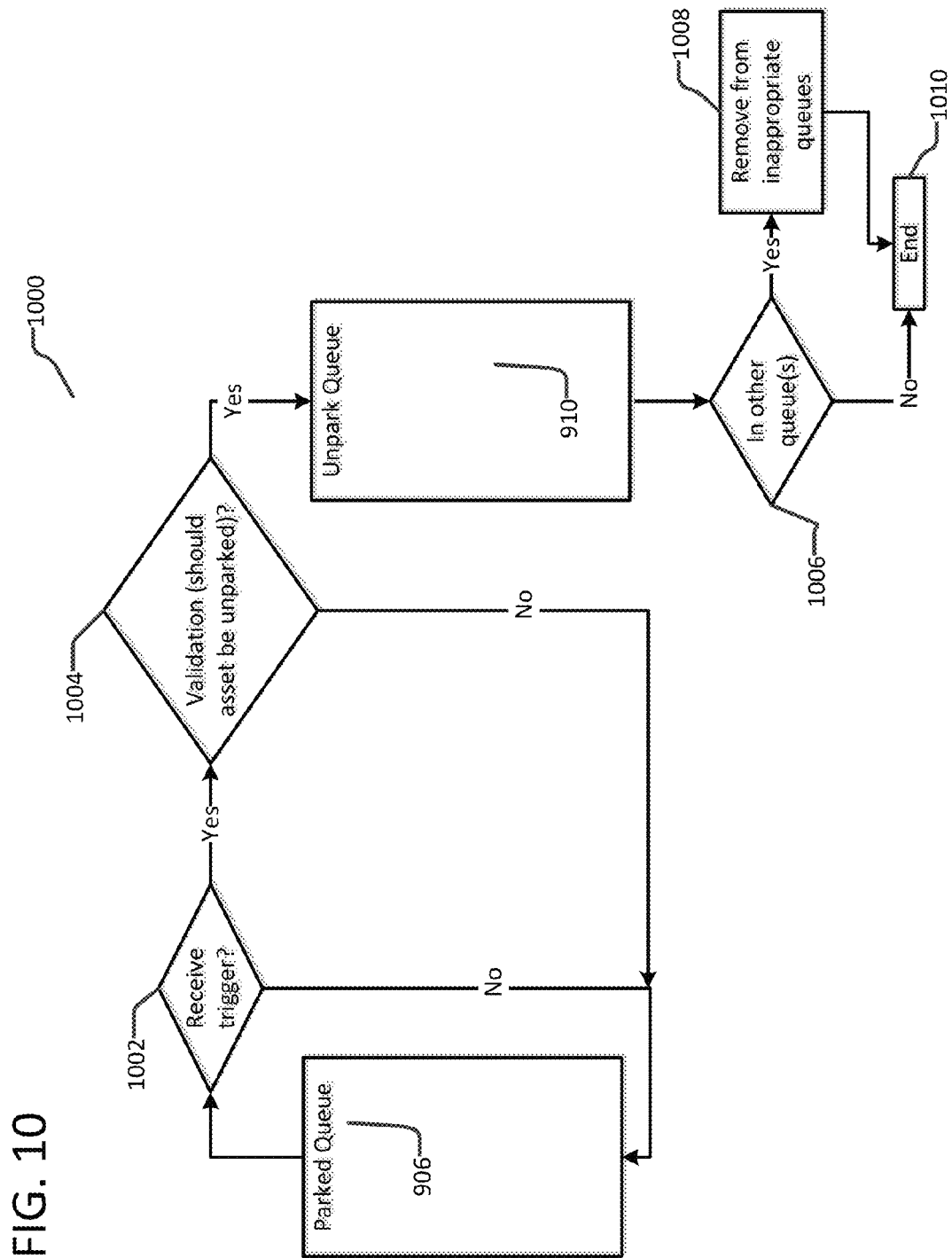
FIG. 10 shows a method for storage and tracking of data relating to unparking an asset according to an embodiment of the invention.

FIG. 10 shows a method 1000 for storage and tracking of data relating to unparking an asset according to an embodiment of the invention.

Method 1000 begins with assets/CSDS that are stored in the parked queue 906. At 1002 a query is made whether a trigger is received. Triggers here may include time-based triggers (ie each asset in the parked queue that has not been heard from or communicated with for a certain amount of time should be triggered to come out of the parked queue and checked), triggers from other packets that are received in method 800, chokepoint triggers, and the like. Of course if there is no trigger then either asset 30 will not come out of parked queue 906 at all, or will return to parked queue 906.

Having received a trigger, method 1000 continues at 1004 to validate whether the asset is parked. This may be performed substantially as described herein.

If asset 30 should not be unparked then method 1000 continues to return the asset to the parked queue. If asset 30 should be unparked then method 1000 continues to be placed in the unpark queue.

The asset will, at some point, be removed from the unpark queue (as described herein), which may include triggers such as are described herein. At 1006 a query is made whether the asset 30 is in other queues and if so at 1008 it is removed from other queues, as appropriate (appropriateness as described herein, for example as per Tables 1-3).

After 1008, or if asset 30 is in no other queues at 1006, then method 1000 ends with asset 30 having been removed from unpark queue 910.

It is to be understood that RTs and ATs are generally used herein to assist in determining where asset 30 is located and to sequence asset 30. As such, the number, characteristics, and locations of RTs and ATs within site 12 may be chosen to accomplish such locating and sequencing. In particular choices may be made to provide specific analyses as described herein, and specific analyses that increase the confidence of properly locating and sequencing assets 30.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A method for accurate processing of a locating action event for an asset using queues, wherein a park queue, a parked queue, an unpark queue and a delay queue each comprise one or more packets of one or more assets that have information about the asset, received from one or more gateways, that are separately processed and stored in a database by a system that analyzes packets to determine and process locating actions, wherein the system processes packets and locating actions out of order based on one or more external factors or internal factors, the method comprising:

receiving a packet relating to the asset; wherein the asset is a vehicle;

determining, from the packet, a packet type;

obtaining a result of a locating action, performed on the packet and based on the packet type;

removing the asset from one or more inappropriate queues, if the asset is in one or more inappropriate queues, based on the packet type and the result;

placing the asset in one or more appropriate queues based on the packet type and the result;

the one or more appropriate queues selected from the park queue, the parked queue, the unpark queue and the delay queue; wherein the park queue contains packets relating to assets to be parked, the parked queue contains packets relating to assets currently parked, the unpark queue contains packets relating to assets to be removed from a parking spot and the delay queue contains packets relating to assets queued for further processing; and updating the information about the asset in one or more appropriate queues based on the packet; wherein, if the appropriate queue is the park queue or the delay queue then repeating the obtaining, removing, placing and updating until the appropriate queue is either the parked queue or the unpark queue.

2. The method of claim 1 wherein the receiving is from an arrival queue that obtains all packets from one or more gateways.

3. The method of claim 2 wherein the receiving further comprises removing duplicate packets from the arrival queue.

4. The method of claim 1 wherein, if the appropriate queue is the parked queue, the placing further comprises confirming that the packet has been processed in the database.

5. The method of claim 1 wherein the receiving is from one of the park queue or the delay queue.

6. The method of claim 1 wherein the locating action is a parking calculation, the result is a real parking spot, the packet type is a stopped packet or a stationary packet, the inappropriate queues are the delay queue and the unpark queue and the appropriate queue is the park queue.

7. The method of claim 1 wherein the locating action is an unparking action, the packet type is a motion packet, the inappropriate queues are the park queue, delay queue and the parked queue and the appropriate queue is the unpark queue.

8. The method of claim 7 further comprising removing the packet from the unpark queue after confirming that the packet has been removed from the database.

9. A system for accurate processing of a locating action event for an asset using queues, wherein a park queue, a parked queue, an unpark queue and a delay queue each may comprise one or more packets of one or more assets that have information about the asset, received from one or more gateways, that are separately processed and stored in a database by a system that analyzes packets to determine and process locating actions, wherein the system processes packets and locating actions out of order based on one or more external factors or internal factors, the method comprising:
one or more assets configured to transmit packets to one or more gateways;
one of more gateways configured to receive packets from one or more assets and transmit packets to a location management system; and
a location management system further comprising a database, a park queue, a parked queue, an unpark queue and a delay queue that each comprise one or more packets of one or more assets that have information about the asset, configured to:
analyze, process and store packets in the database to determine and process locating actions;
receive a packet relating to the asset, wherein the asset is a vehicle;
determine, from the packet, a packet type;
obtain a result of a locating action, performed on the packet and based on the packet type;
remove the asset from one or more inappropriate queues, if the asset is in one or more inappropriate queues, based on the packet type and the result;
place the asset in one or more appropriate queues based on the packet type and the result; the one or more appropriate queues selected from the park queue, the parked queue, the unpark queue and the delay queue; wherein the park queue contains packets relating to assets to be parked, the parked queue contains packets relating to assets currently parked, the unpark queue contains packets relating to assets to be removed from a parking spot and the delay queue contains packets relating to assets queued for further processing; and
update the information about the asset in one or more appropriate queues based on the packet; wherein, if the appropriate queue is the park queue or the delay queue then repeating the obtaining, removing, placing and updating until the appropriate queue is either the parked queue or the unpark queue.

10. The system of claim 9 wherein the receiving is from an arrival queue that obtains all packets from the one or more gateways.

11. The system of claim 10 wherein the receiving further comprises removing duplicate packets from the arrival queue.

12. The system of claim 9 wherein, if the appropriate queue is the parked queue, the placing further comprises confirming that the packet has been processed in the database.

13. The system of claim 9 wherein the receiving is from one of the park queue or the delay queue.

14. The system of claim 9 wherein the locating action is a parking calculation, the result is a real parking spot, the packet type is a stopped packet or a stationary packet, the inappropriate queues are the delay queue and the unpark queue and the appropriate queue is the park queue.

15. The system of claim 9 wherein the locating action is an unparking action, the packet type is a motion packet, the inappropriate queues are the park queue, delay queue and the parked queue and the appropriate queue is the unpark queue.

16. The system of claim 15 wherein the location management system is further configured to remove the packet from the unpark queue after confirming that the packet has been removed from the database.

* * * * *